UNITED STATES PATENT OFFICE.

CHARLES O. LUNDBERG, OF CHICAGO, ILLINOIS, ASSIGNOR OF A PART OF HIS RIGHT TO JAMES SMITH, AUGUSTUS SPARR, AND DANIEL J. AVERY, OF SAME PLACE.

IMPROVEMENT IN RESTORING AND PRESERVING STONE.

Specification forming part of Letters Patent No. 216,045, dated June 3, 1879; application filed January 13, 1879.

*To all whom it may concern:*

Be it known that I, CHARLES O. LUNDBERG, of Chicago, Cook county, State of Illinois, have invented a new and useful Improvement in Restoring and Preserving Stone, of which the following is a full description.

This invention relates to means employed for preserving stone, and restoring the same to the appearance of new stone after the same has become discolored by exposure. It is primarily designed to be used in connection with limestone, but is not limited to such stone.

I accomplish the desired result by applying to the surface of the stone, after it has been cleaned, a mixture of lime-putty, hydraulic cement, and water, and to produce the best results then apply an alkaline solution.

The mixture of lime-putty and hydraulic cement I usually prepare as follows: Take two parts of lime-putty, as usually prepared for plastering purposes, and one part of hydraulic cement, and mix the same with water to the consistency of thick cream, mixing at one time only so much as can be conveniently applied before the mixture sets and becomes hard. This mixture when applied to the surface of the cleaned stone, as hereinafter fully described, performs an important office, and is the essential feature; but it is desirable that the stone be suitably cleaned and prepared before applying said mixture, and that after the use of this mixture an alkaline silicate be applied. I therefore proceed to describe the entire process:

I first cleanse the surface of the stone by washing with water, and then with a solution containing one or more of the alkalies—soda, potash, or ammonia. The alkalies are thus used on account of their detergent properties, and to neutralize any free acids which may have been absorbed by the stone, and which are one of the chief causes of the destruction of stone.

When the surface of the stone has become about dry, I give it a new face by rubbing the stone with hard fine-grained sandstone, the pores of the stone being filled with the dust from the two stones. I then apply the above-described mixture of lime-putty, hydraulic cement, and water, thoroughly filling the pores of the stone, and giving it a continuous smooth and uniform covering, the coating not being thick enough to materially change the natural appearance of the stone.

This mixture can be most conveniently and properly applied by means of cloths, leaving a smoother surface than when applied with a brush.

Before this mixture of lime-putty and hydraulic cement with water becomes dry and hard, I spread over the same a solution of an alkaline silicate—soda or potash—of specific gravity about 15° Baumé, using a brush. The alkaline silicate decomposes, and forms, with the lime and other bases, an insoluble silicate.

I thus provide a thin coating of artificial stone which is free from acids, and protects the stone against the action of the elements. After it has hardened it will absorb but very little if any moisture.

A polished surface may be produced, if desired, by rubbing with cloths saturated with a silicate solution after the coating has partially hardened.

Sandstone may be treated in substantially the same manner; but it is desirable when treating sandstone to add to the mixture of lime-putty and hydraulic cement such quantity of powdered sandstone or fine-grained sand as will produce a surface similar to the stone to be treated.

Any desired color can be given to the coating by adding to the lime-putty and hydraulic cement mixture a sufficient quantity of the metallic oxides commonly used as pigments.

By this process disfigured stone can be restored to its natural appearance, and also be provided with a coating of articial stone practically indestructible by the weather and ordinary exposure, which is very desirable, especially in cities. The coating of artificial stone becomes firmly and thoroughly connected with and attached to the stone—in fact, becoming a part of the stone to which it is applied.

Ordinary stains of oxide of iron, which frequently do not appear until the stone has been for some time exposed, may be covered over and the stains concealed.

Of course good results cannot be attained without first cleaning the stone. Rubbing the cleaned stone with sandstone and filling the pores with the dust is desirable, but not absolutely essential.

As before stated, a thin coating does not materially change the natural appearance of the stone. When the stone is so discolored that a thick coating of lime-putty and hydraulic cement are required the same can be properly colored.

What I claim as new is as follows:

The method of restoring and preserving stone by first washing the same with an alkaline solution to destroy the acids which have been absorbed by the stone, then applying a mixture of lime-putty, hydraulic cement, and water, and then applying a solution of an alkaline silicate, substantially as specified.

CHARLES O. LUNDBERG.

Witnesses:
E. A. WEST,
O. W. BOND.